US006428896B1

(12) United States Patent
Ramsey et al.

(10) Patent No.: US 6,428,896 B1
(45) Date of Patent: *Aug. 6, 2002

(54) LOW TEMPERATURE MATERIAL BONDING TECHNIQUE

(75) Inventors: J. Michael Ramsey, Knoxville; Robert S. Foote, Oak Ridge, both of TN (US)

(73) Assignee: UT-Battelle, LLC, Oak Ridge, TN (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/098,743

(22) Filed: Jun. 17, 1998

Related U.S. Application Data

(62) Division of application No. 08/645,497, filed on May 16, 1996, now abandoned.

(51) Int. Cl.[7] .............................. B32B 9/00; B32B 3/26; B05D 5/00
(52) U.S. Cl. .................... 428/428; 428/426; 428/315.5; 428/315.9; 427/243
(58) Field of Search ................. 428/426, 428, 428/315.5, 315.9; 427/243

(56) References Cited

U.S. PATENT DOCUMENTS

| 3,274,029 A | | 9/1966 | Lurie et al. | |
| 3,492,163 A | | 1/1970 | Hilmer | |
| 3,615,948 A | | 10/1971 | Krostewitz | |
| 3,662,440 A | | 5/1972 | Snedeker | 161/193 |
| 3,730,774 A | | 5/1973 | McKee et al. | |
| 3,880,632 A | * | 4/1975 | Podvigalkina | 65/37 |
| 3,953,566 A | | 4/1976 | Gore | |
| 4,052,524 A | | 10/1977 | Harakas et al. | 428/383 |

(List continued on next page.)

OTHER PUBLICATIONS

Merriam–Webster's Collegiate Dictionary, 10th Edition, p. 734, 1998.*

Hirano, Shinichi; Kim, Junbom, Kim; Srinivasan "High Performance Proton Exchange Membrane Fuel Cells With Sputter–Deposited Pt Layer Electrodes," *Electochimica Acta*, vol. 42 (10), pp. 1587–1593 (1997).

K. Kinoshita, "Fuel Cells", *Encyclopedia of Chemical Technology*, 4th Edition, vol. 11, pp. 1098–1121.

Morita, Masayuki; Iwanaga, Yukinori; and Matsuda Yoshiharu Anodic Oxidation of Methanol at a Gold–Modified Platinum Electorcatalyst Prepared by RF Sputtering on a Glassy Carbon Support, *Electrochimica Acta*, vol. 36 (5/6) 1991, pp. 947–951.

Mukerjee, Sanjeev; Srinivasan, Supramaniam; Appleby, A. John "Effect Of Sputtered Film of Platinum of Low Platinum Loading Electordes on Electrode Kinetics of Pxygen Reduction in Proton Exchange Membrane Fuel Cells," *Electochimica Acta*, vol. 38 (12) 1993, pp. 1661–1669.

Poirier, Jeffrey A.; Stoner, Glenn E. "Microstructural Effects on Electrocatalytic Oxygen Reduction Activity of Nano–Grained Thin–Film Platinum in Acid Media" *Journal of the Electrochemical Society*, vol. 141(2), Feb. 1994, pp. 425–430.

Srinivasan et al. "Recent Advances in Solid Polymer Electrolyte Fuel Cell Technology with Low Platinum Loading Electrodes," *Journal of Power Sources*, vol. 29 (1990), pp. 367–387.

(List continued on next page.)

*Primary Examiner*—Harold Pyon
*Assistant Examiner*—Michael C. Miggins
(74) *Attorney, Agent, or Firm*—Kilpatrick Stockton LLP

(57) ABSTRACT

A method of performing a lower temperature bonding technique to bond together two mating pieces of glass includes applying a sodium silicate aqueous solution between the two pieces.

27 Claims, 7 Drawing Sheets

U.S. PATENT DOCUMENTS

| | | | |
|---|---|---|---|
| 4,160,856 A | | 7/1979 | Warszawski |
| 4,451,312 A | | 5/1984 | Nolte |
| 4,547,437 A | | 10/1985 | Isenberg et al. |
| 4,686,158 A | | 8/1987 | Nishi et al. |
| 4,738,904 A | | 4/1988 | Ludwig et al. |
| 4,826,741 A | | 5/1989 | Aldhart et al. |
| 4,876,115 A | | 10/1989 | Raistrick |
| 4,879,041 A | | 11/1989 | Kurokawa et al. ............ 210/640 |
| 4,883,215 A | | 11/1989 | Goesele et al. |
| 4,908,339 A | | 3/1990 | Blount |
| 4,931,152 A | | 6/1990 | Naik et al. |
| 4,937,152 A | | 6/1990 | Sato et al. |
| 5,021,236 A | | 6/1991 | Gries et al. |
| 5,068,126 A | | 11/1991 | Suzuki et al. |
| 5,088,003 A | | 2/1992 | Sakai et al. |
| 5,151,334 A | | 9/1992 | Fushimi et al. |
| 5,192,523 A | | 3/1993 | Wu et al. |
| 5,208,112 A | | 5/1993 | Ludwig et al. |
| 5,211,984 A | | 5/1993 | Wilson |
| 5,234,777 A | | 8/1993 | Wilson |
| 5,238,518 A | | 8/1993 | Okubi et al. |
| 5,264,285 A | | 11/1993 | Dougherty |
| 5,296,274 A | | 3/1994 | Movchan et al. |
| 5,338,430 A | | 8/1994 | Parsonage et al. |
| 5,340,665 A | | 8/1994 | Khandkar |
| 5,378,502 A | | 1/1995 | Willard et al. ............... 427/305 |
| 5,403,451 A | * | 4/1995 | Riviello et al. ........... 204/153.3 |
| 5,407,856 A | | 4/1995 | Quenzer et al. |
| 5,413,620 A | | 5/1995 | Henry .......................... 65/406 |
| 5,478,527 A | * | 12/1995 | Gustafson et al. ........ 422/82.11 |
| 5,483,767 A | * | 1/1996 | Beattie ..................... 435/287.1 |
| 5,500,292 A | | 3/1996 | Muranaka et al. |
| 5,503,704 A | | 4/1996 | Bower et al. |
| 5,509,189 A | | 4/1996 | Tuller et al. |
| 5,543,648 A | | 8/1996 | Miyawaki ................... 257/347 |
| 5,547,551 A | | 8/1996 | Bahar et al. |
| 5,561,000 A | | 10/1996 | Dirven et al. |
| 5,578,179 A | * | 11/1996 | Demorest et al. ............ 204/451 |
| 5,580,605 A | | 12/1996 | Ogawa et al. .............. 427/155 |
| 5,580,846 A | | 12/1996 | Hayashida et al. ......... 510/175 |
| 5,599,614 A | | 2/1997 | Bahar et al. |
| 5,624,718 A | | 4/1997 | Dearnaley |
| 5,635,041 A | | 6/1997 | Bahar et al. |
| 5,644,373 A | | 7/1997 | Furushima et al. |
| 5,681,484 A | | 10/1997 | Zanzucchi et al. |
| 5,686,199 A | | 11/1997 | Cavalca et al. |
| 5,750,013 A | | 5/1998 | Lin |
| 5,795,672 A | | 8/1998 | Dearnaley |
| 5,843,767 A | | 12/1998 | Beattie |
| 6,129,854 A | * | 10/2000 | Ramsey et al. ............... 216/18 |

OTHER PUBLICATIONS

Taylor, E.J.; Andersen, E.B.; Vilambi, N.R.K. "Preparation of High–Platinum–Utilization Gas Diffusion Electodes for Proton–Exchange–Membrane Fuel Cells," *Journal of the Electrochemical Society*, vol. 139 (5), May 1992, pp. L45–L46.

Ticianelli, Edson A.; Derouin, Charles B.; Srinivasan, Supramaniam, "Localization of Platinum in Low Catalyst Loading Electrodes to Attain High Power Densities in SPE Fuel Cells," *Journal of Electroanalytical Chemistry and Interfacial Electrochemistry*, vol. 251 (2), Sep. 23, 1988, pp. 275–295.

Weber, Michael F.; Mamiche–Afara, Suzanne; Dignam, Michael J. "Sputtered Fuel Cell Electrodes," *Journal of the Electrochemical Society*, vol. 134, Jun. 1987, pp. 1416–1419.

* cited by examiner

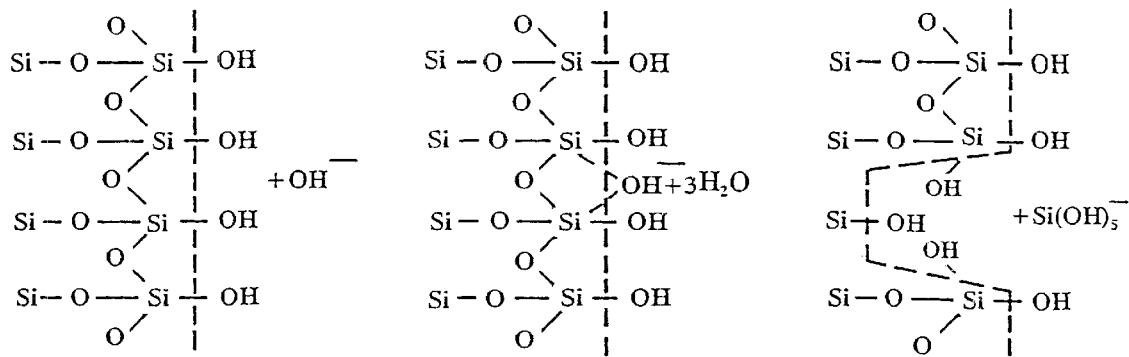
Fig_1
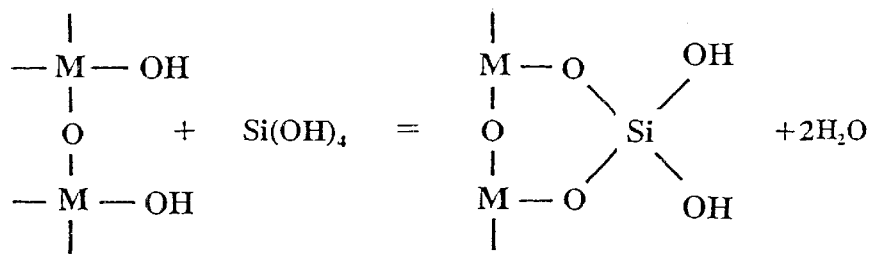
Fig_2

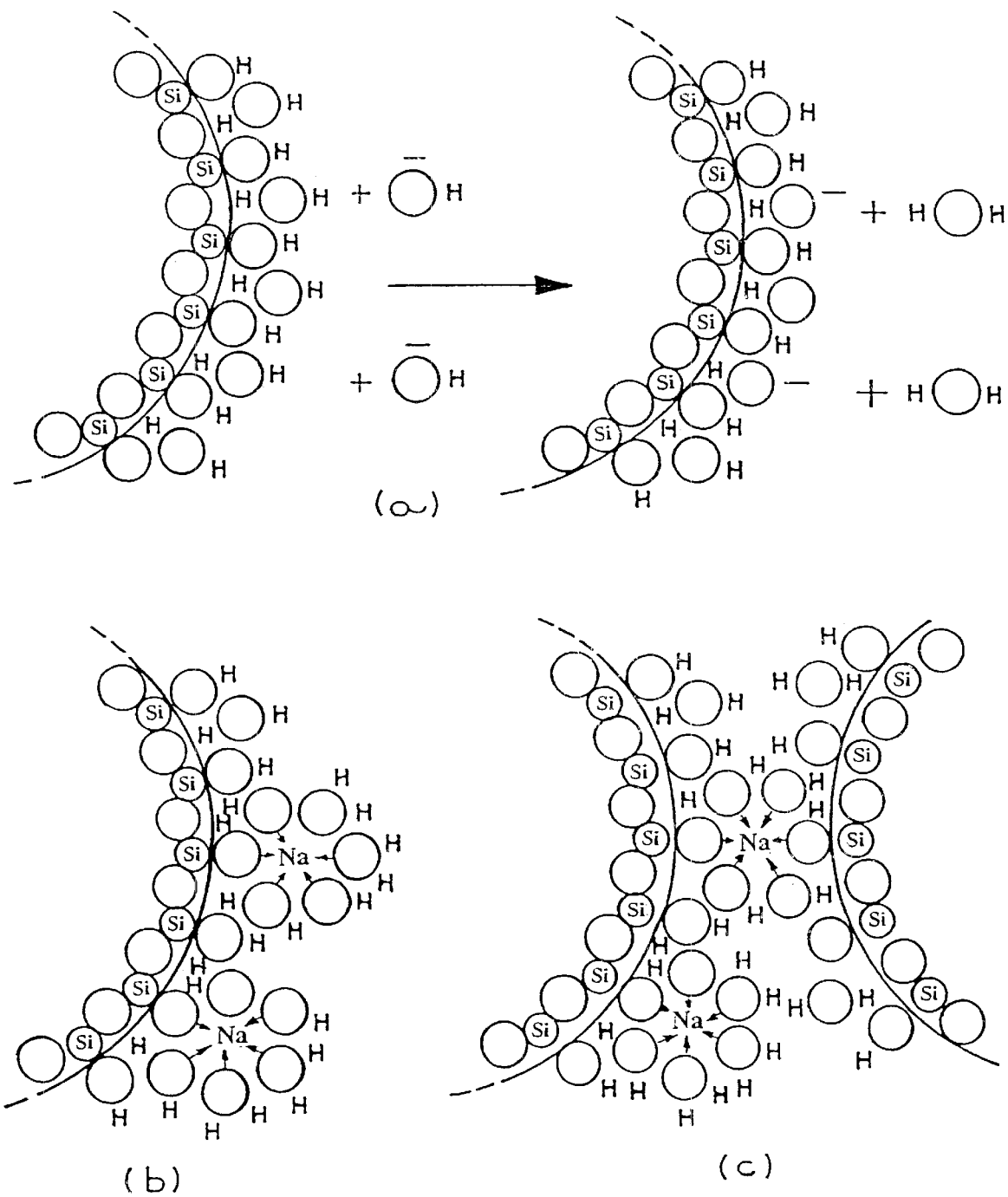
Fig_4

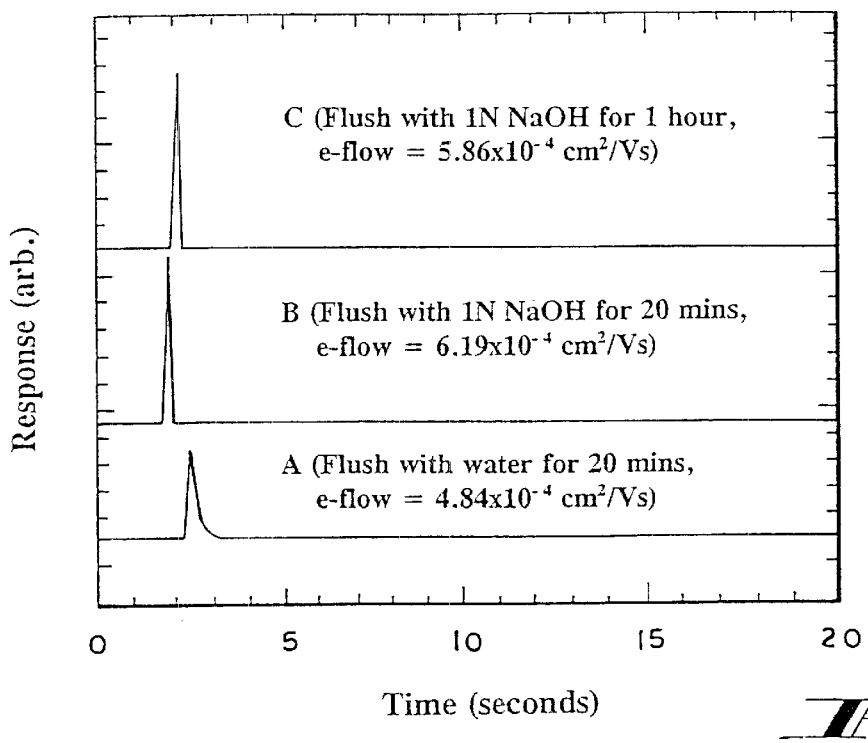
Fig_5
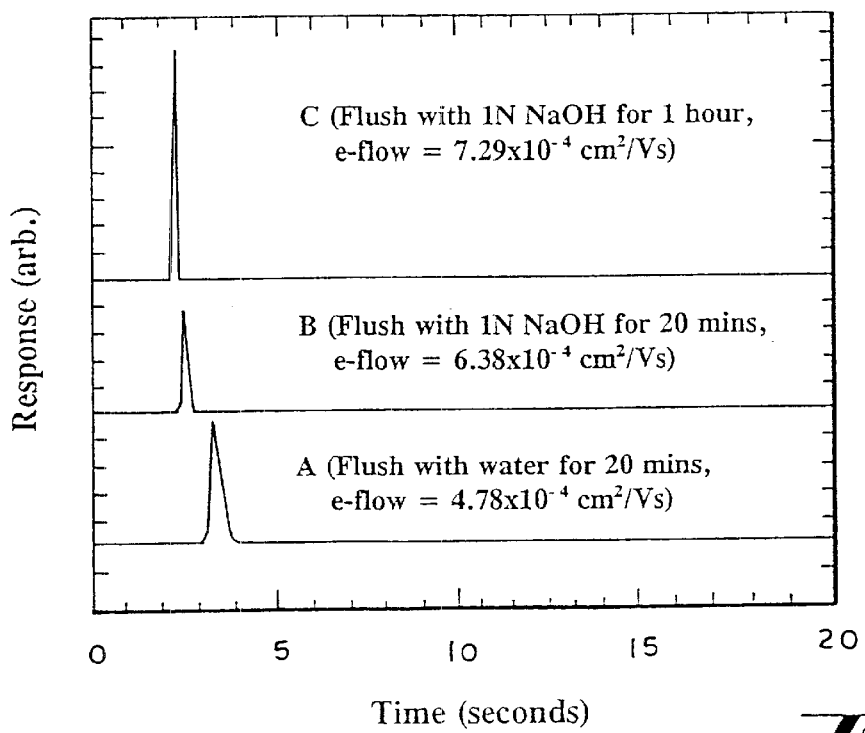
Fig_6

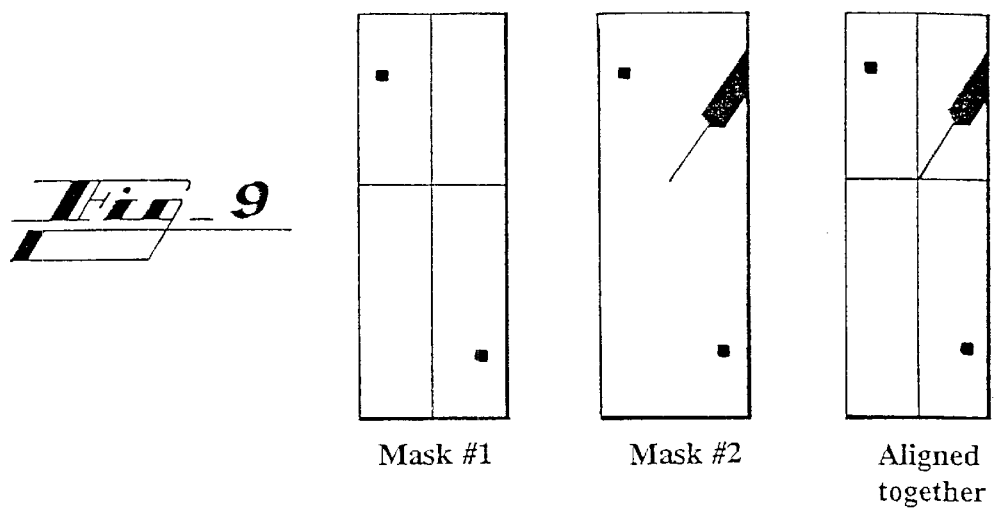
Mask #1    Mask #2    Aligned together
Fig_9
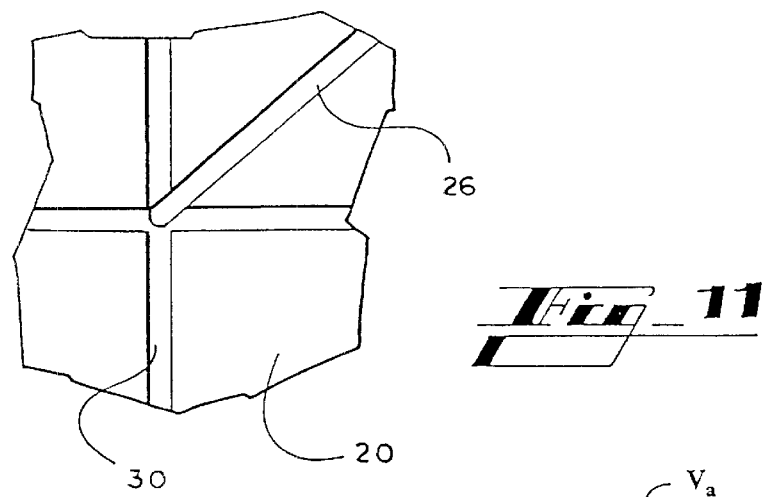
Fig_11
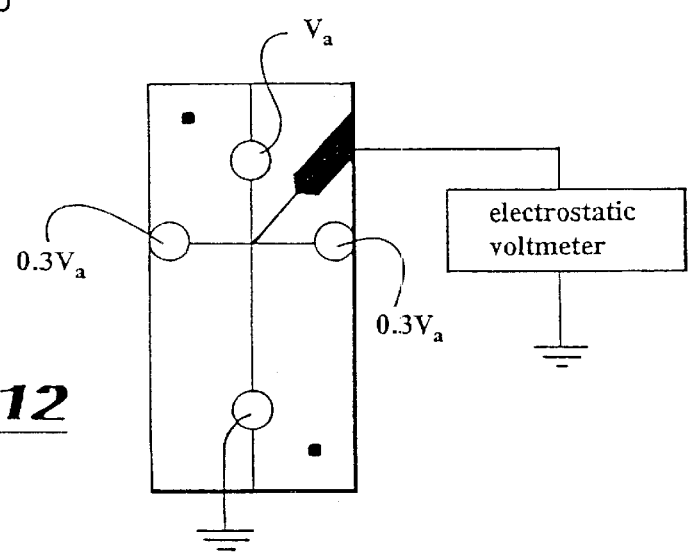
Fig_12

(a) substrate with channel
(b) spin on photoresist
(c) pattern photoresist
(d) HF etching
(e) deposit metal film
(f) lift off process
(g) sodium silicate bonding

LOW TEMPERATURE MATERIAL BONDING TECHNIQUE

This is a divisional application Ser. No. 08/645,497 filed May 16, 1996 now abandoned.

This invention was made with Government support under contract DE-AC05-84OR21400 to Lockheed Martin Energy Systems, Inc. and the Government has certain rights in this invention.

FIELD OF THE INVENTION

The present invention relates to a method of bonding glass components at temperatures below 100° C., and more specifically, to a method of bonding two mating pieces of material together using a monomolecular or quasi-molecular film that covalently bonds to both surfaces.

BACKGROUND OF THE INVENTION

Low temperature bonding methods can enable technology by allowing the manufacture of devices that include a broader range of materials. Temperature processing can limit materials selection due to decomposition, vaporization, dissolution, or coefficient of expansion. For example, a variety of micro devices for chemical and biochemical analysis are being developed.

The fabrication of many of these devices requires the bonding of glass components, such as the bonding of a glass cover plate to a photo lithographically etched glass substrate, in order to produce a device containing closed micro channels. This bonding process has previously been carried out by fusing the two components at high temperature (e.g. 500–1,100° C.), preventing the inclusion of biomolecules or other temperature-sensitive materials in open channels. It also allows the two components to have different thermal coefficients of expansion.

Currently under development are devices for the analysis of nucleic acids. These devices require the attachment of nucleic acid probes to specific sites within the micro channels formed in a glass substrate, which is most efficiently carried out in open channels prior to bonding a cover plate to the substrate. However, conventional, high temperature bonding techniques would damage the probes and thus compromise the integrity of the analysis. Moreover, adhesive bonding techniques are undesirable given the very small (micron order) dimensions of the micro channels.

Thus, a continuing need exists for a low temperature bonding technique.

SUMMARY OF THE INVENTION

An object of the present invention is to provide a low temperature bonding process that will allow the incorporation of DNA probes or other temperature-sensitive molecules on the substrates and facilitate manufacture of such devices.

Another object of the present invention is to provide a method of bonding two different types of glass substrate materials together or the inclusion of thin metal films on a structure prior to bonding. In the former case, high temperatures preclude bonding due to different coefficients of thermal expansion. After bonding at high temperature, stress is introduced by the variation in dimension upon cooling to room temperature.

Another object of the present invention is to provide a low temperature bonding technique that obviates problems associated with metal films which are deposited at high temperatures, by avoiding vaporization or diffusion into the substrate material.

These and other objects are achieved by providing a method of bonding two mating pieces of material together which includes applying an aqueous solution of sodium silicate to a surface of one of the two mating pieces, and then contacting the mating pieces with the aqueous solution therebetween.

Preferably, the solution is spun-on at high speed on the one piece, and then the other piece is immediately brought into contact.

Other objects, advantages, and salient features of the invention will become apparent from the following detailed description, which taken in with the annexed drawings, discloses the preferred embodiment of the present invention.

BRIEF DESCRIPTION OF THE DRAWINGS

FIG. 1 illustrates a mechanism of dissolution of silica in water in the presence of hydroxyl ions;

FIG. 2 illustrates a deposition mechanism for silica on a solid surface;

FIG. 4 illustrates bonding between silica particles through coordination with flocculating metal cations;

FIG. 5 is a graph illustrating electro-osmotic flow of a chip made from sodium silicate bonding (7 wt. % and 90° C. for 1 hour);

FIG. 6 is a graph illustrating electro-osmotic flow of a chip made from direct bonding;

FIG. 9 illustrates a method of fabricating an in-column electrode using two masks;

FIG. 11 is an enlarged top view of the cross area of a microchip and electrode formation; and FIG. 12 is a top view of a microchip and electrode formation.

DETAILED DESCRIPTION OF THE PREFERRED EMBODIMENT

Figure 3:
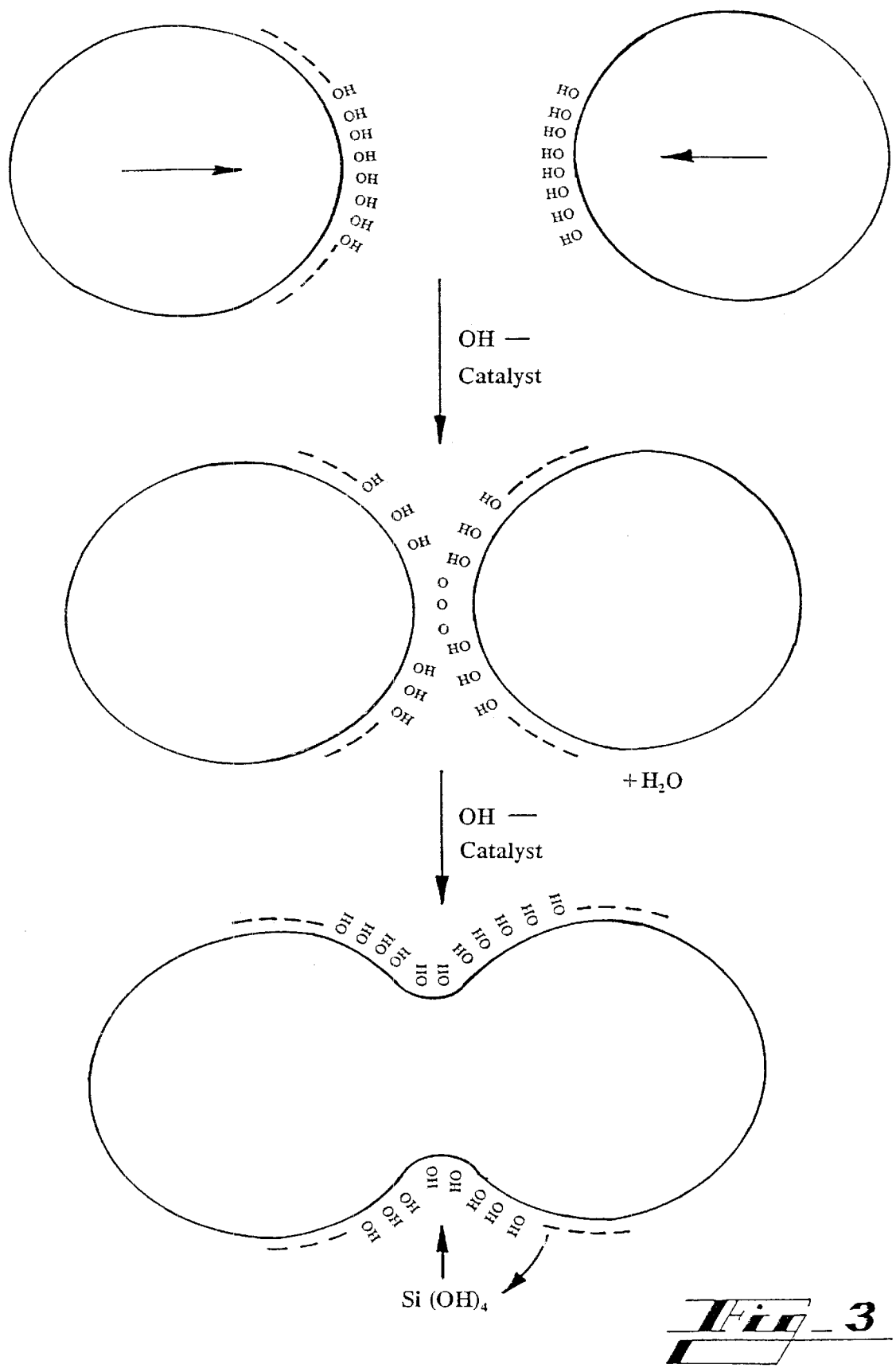
FIG. 3 illustrates the bond formation between silica particles.

Silica-water systems are discussed thoroughly in *The Chemistry of Silica* by R. K. Iler (Wiley, N.Y. 1979), wherein it was noted that as water is a unique liquid, so is amorphous silica a unique solid. They are similar, both consisting mainly of oxygen atoms with the smaller hydrogen or silicon atoms in the interstices. There is no evidence that silica is more soluble in any other liquid than water through hydrolysis forming silicic acid $Si(OH)_4$:

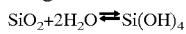

Supersaturated solutions of silicic acid in pure water are thermodynamically unstable because condensation polymerization through dehydration takes place. Thus, the dissolution and deposition of silica in water involves hydration and dehydration reactions catalyzed by OH ions:

When the solution is highly supersaturated and insufficient solid silica surface is available to permit rapid deposition of soluble silica, new small nuclei particles are formed by intercondensation on monomer and low polymers. Silica is also deposited on these nuclei until supersaturation is relieved. It is in this manner that colloidal particles of silica are formed. See *The Chemistry of Silica,* supra, pp. 3–6.

The reported solubility values for amorphous silicas range from 70 to more than 150 ppm $SiO_2$ at 25° C. due to differences in particle size, state of internal hydration, and the presence of traces of impurities. There is an apparent increase in the solubility from pH 9 to 10.7, owing to the formation of silicate ion in addition to the monomer $Si(OH)_4$ which is in equilibrium with the silica solid phase:

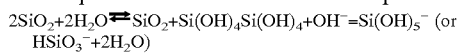
$2SiO_2+2H_2O \rightleftharpoons SiO_2+Si(OH)_4Si(OH)_4+OH^-=Si(OH)_5^-$ (or $HSiO_3^-+2H_2O$)

Above pH 10.7, all the solid phase of amorphous silica dissolves to form soluble silicate, since at higher pH the concentration of $Si(OH)_4$ is greatly lowered by conversion to ionic species, so that no amorphous solid can remain in equilibrium. The sodium silicate is usually written as $SiO_2 \cdot Na_2O$ which is from:

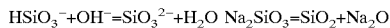
$HSiO_3^-+OH^-=SiO_3^{2-}+H_2O$  $Na_2SiO_3=SiO_2+Na_2O$

The dissolution process of silica requires the presence of a catalyst which can be chemisorbed and increases the coordination number of a silicon atom on the surface to more than four, thus weakening the oxygen bonds to the underlying silicon atoms. The hydroxyl ion is the unique catalyst in alkaline solutions and fluoride ion in hydrofluoric acid solutions.

FIG. 1 shows a mechanism of dissolution of silica in water in the presence of hydroxyl ions. The first step is the adsorption of $OH^-$, after which a silicon atom goes into solution as a silicate ion. If the pH is much below 11, the silicate ion hydrolyzes to $Si(OH)_4$ and $OH^-$ and the process is repeated. Hydrofluoric acid probably acts in the same way, the first step being chemisorption of a $F^-$ ion, which is about the same size as $OH^-$ ion. Above pH 11 the hydroxyl ions keep converting $Si(OH)_4$ to silicate ions, thus keeping the solution unsaturated so that silica continues to dissolve.

Silica can be deposited molecularly from supersaturated aqueous solution. The mechanism for deposition of $SiO_2$ from $Si(OH)_4$ is apparently the reverse of dissolution of solid silica. Supersaturation can be brought about by lowering the pH of an aqueous solution of a soluble silicate. The deposition involves a condensation reaction catalyzed by hydroxyl ions. Therefore, the process occurs principally above pH 7 where the hydrolysis of silicate ions occurs, but not above pH 11 where silica dissolves as silicate ion. The degree of supersaturation must be sufficient for deposition to occur, but must not be so great as to allow the formation of colloidal particles, or the process becomes very inefficient.

FIG. 2 shows the silica deposition on a solid surface. Monomeric silica $Si(OH)_4$ condenses with any preexisting solid surface that bears OH groups with which it can react, namely, SiOH, or any MOH surface, where M is a metal that will form a silicate at the pH involved. Once a receptive surface is covered by the reaction shown in FIG. 2, the further deposition is silica on silica, thus building up a film.

There is no analogy between silicic acid polymerized in an aqueous system and condensation-type organic monomers which polymerize into linear chains and then are branched and cross-linked. The polymerization of silica is recognized in three stages: (1) polymerization of monomer to form particles; (2) growth of particles; and (3) linking particles together (aggregation) into branched chains, then networks, finally extending throughout the liquid medium, thickening it to a gel.

Thus, formation and growth of spherical particles is one kind of polymerization and aggregation of particles to form viscous sols and gels is another kind of polymerization. Both types of polymerization may occur at once and have the same mechanism of condensation to form siloxane (Si—O—Si) bonds. The polymerization of monomer to form particles occurs once the monomer is at a concentration greater than the solubility of the solid phase of amorphous silica. At low pH the silica particles bear very little ionic charge and thus can collide and aggregate into chains and then gel networks. Above pH 6 or 7, and up to 10.5, where silica begins to dissolve as silicate, the silica particles are negatively charged and repel each other. Therefore, they do not collide, so that particle growth continues without aggregation. It is in this way that the more alkaline sols are stabilized. Sodium silicate solution is quite stable at pH 12, but the pH may drop in storage owing to absorption of atmospheric carbon dioxide.

FIG. 3 shows the mechanism of gel formation through inter-particle bonding to form Si—O—Si bonds when particles collide. Iler also proposed a mechanism for particle coagulation which involves cationic bridging agents. FIG. 4 shows the series of events which is postulated to occur as silica particles are bridged by $Na^+$ cations. Firstly, surface hydroxyls transfer protons to the hydrogen-bonded water layer; next, a sodium ion is adsorbed at the negative site; and finally, contact with another particle results in formation of a coordination linkage between silica particles.

Based on Iler's theory, Michalske and Fuller studied closure and re-propagation of healed cracks in silicate glass at relative humidities (rh) between 0.01% and 100% at room temperature. They measured the crack opening and closure forces as the strain energy release rate G which described the energy associated with increasing the length of a crack having unit width. Two types of glass were compared. One was vitreous silica and the other was soda-lime-silica float glass having the composition of (in mol %) 75% $SiO_2$, 14% $Na_2O$, 10% CaO, 1% other. See *Closure and Repropagation of Healed Cracks In Silicate Glass,* by T. A. Michalske and E. R. Fuller, Jr., J. Am. Ceram. Soc., 68 (1985) 586.

Michalske and Fuller found that the initial bonding energy (crack closure) was 0.15 $J/m^2$ at 50% rh for both glasses which corresponded to hydrogen bonding through bridged water molecules. The energy required to reopen a healed crack in vitreous silica glass was nearly equal to the crack closure energy at all humidities. However, healed crack in vitreous silica glass was nearly equal to the crack closure energy at all humidities. However, the energy required to reopen a healed crack in silicate glass measured 1.7 $J/m^2$ in driest conditions, much larger than the value that can be explained by hydrogen bonding, although at humidities higher than 70% the reopen energy was almost the same as the closure energy. This suggested that once crack surfaces have been pulled together by hydrogen bonding, further reactions enhance the bridging linkages between silicate glass surfaces.

Two mechanisms were proposed to describe the increased adhesion between silicate glass surfaces: one was cationic bridging and the other siloxane bridging. Michalske and Fuller discussed that once surfaces have been pulled together by hydrogen bonding which can connect a separation up to 1.0 nm, the development of electrostatic bonds would reduce the crack separation to ~0.4 nm (equal to the diameters of one sodium and one oxygen).

At this separation, it may be feasible to form siloxane bridges which completely close the distance between crack surfaces. Since crack healing was observed to be independent of the number of cycles, the cationic bridging mechanism was favored to explain the healing effects at room temperature.

Using the previous work as their baseline, Michalske and Keefer later studied the adhesion of hydrated silicate films at different temperatures. See "Adhesion of Hydrated Silicate Films", *Mat. Res. Soc. Symp. Proc.*, by T. A. Michalske and K. D. Keefer, 121 (1987) 187. Three silicate solutions were investigated: a sodium hydroxide stabilized colloidal silica (3 wt. % $SiO_2$), an aqueous solution containing hydrolyzed tetramethoxysilane (TMOS) (6 wt. % $SiO_2$), and a sodium silicate solution (3 wt. % $SiO_2$). The investigators introduced the silicate solutions in crack surfaces of silica glass plates and then allowed the crack to close. The samples were heat treated and the cracks were reopened at the treated interfaces. It was found that the colloidal silicate solution showed hydrogen bonding (0.15 $J/m^2$) up to 200° C. and no interfacial bonding at temperatures from 300 to 800° C.

It was suggested that once the water was removed, the particles did not strongly interact with the substrate surface. The hydrolyzed TMOS solution showed hydrogen bonding up to 400° C. At temperatures above 400° C., the interfacial bond strength increased and was attributed to condensation reactions forming siloxane bonds. The sodium silicate solution generated the largest interfacial energy. The adhesion energy measured after heat treatment from room temperature to 100° C. (3.7 $J/m^2$) was greater than the value predicted for simple cationic bridging (2.0 $J/m^2$). The investigators suggested that since sodium silicate solutions were known to polymerize at room temperature, some siloxane bond formation accompanied the cationic bond formation. With a heat treatment of 200° C. or above, an adhesion energy as large as the cohesive energy of silica glass was obtained indicating the siloxane bond formation between the silicate film and substrate surface.

From the results obtained, Michalske and Keefer concluded that film adhesion through the formation of siloxane bonds to the silica substrate is most likely to occur when the solution species are polymeric in nature; i.e., the silicate species in solution are not highly crosslinked and have high reactivity. In the case of sodium silicate solution, there is also the effect of cationic bridging that must be considered in the measured adhesion.

Quenzer and Benecke used thin sodium silicate layers to bond two oxidized silicon wafers together and the method was a modified process for silicon direct bonding to reduce the process temperatures. The wet-thermal growth of $SiO_2$ on silicon wafer had a thickness in the range of 100 to 1,200 nm. After a hydrophilic treatment (hot nitric acid), diluted solutions of sodium silicate ($Na_2O:SiO_2$~1:3 with concentrations of 0.1, 0.5, 2.0, 5.0 wt. % in water) were spun (3,000 rpm) onto one of the two surfaces and the two wafers were brought into contact immediately. The investigators found that after a final temperature treatment above 200° C. for two hours, the surface energy reached a maximum value of about 3 $J/m^2$ and this value was obtained in conventional silicon direct bonding at temperatures above 1,000° C.

During the experiments the investigators noticed that the nature of the diluted solutions changed after several months and made the bonding nearly impossible. They suggested that atmospheric $CO_2$ probably initiated condensation reactions between the silicate ions, forming silica sols, and prevented bonding by deposition of small particles on the wafer surface. The bonding mechanism was proposed to be an initial hydrophilic attraction of two surfaces bring the two wafers into close contact, and a further condensation reaction in the silicate layers resulting in strong bonds between the two surfaces during the annealing process.

Similar studies were also conducted by Yamada et al. See "SOL by Wafer Bonding With Spin-on Glass as Adhesive" by A. Yamada et al., *Electronics Letters,* 23 (1987) 39, and "Bonding Silicon wafer to Silicon Nitride With Spin-on glass as Adhesive", by A. Yamada et al., *Electronics Letters,* 23 (1987) 314. Yamada et al. used commercially available spin-on glass (SOG) as an adhesive with $Si(OH)_x$ as the main ingredient, where 2<x <4, to bond silicon wafers with both silicon dioxide and silicon nitride films on the substrates.

The SOG films were spun on the surfaces of two silicon wafers and the wafers were annealed for 10 minutes at 250° C. to facilitate the dehydration process and make the composition of the film $SiO_2$. the annealed wafers were soaked in organic alkaline solution for 5 minutes and rinsed with water. They were brought into contact with each other in a vacuum and annealed for 1 hour at 250° C. in the vacuum while pressed to each other at pressures less than 10 $kg/cm^2$. The bonding was very strong and the wafers could not be separated without breaking them. They suggested that the bonding is due to the enhanced surface reactivity of the SOG films which possess a high density of OH groups for dehydration reactions.

With the foregoing in mind, the subject invention is a method for bonding glass components or other metal oxide forming materials at temperatures below 100° C. The method may be used to fabricate a variety of devices, including microdevices containing biomolecules or other temperature-sensitive materials and is also suitable for bonding optical components or other materials that are adversely affected by high temperatures.

The invention includes a method for bonding two mating pieces of material together using a monomolecular or quasi-monomolecular film that covalently bonds to both surfaces. The method is simple, flexible and effective for low temperature fabrication of microchip devices for capillary electrophoresis, for example. As such, the method facilitates the manufacture, on a commercially viable scale, of microfluidic devices containing diagnostic chemical arrays of binding moieties. Applications of such devices include medical diagnostics, forensics and genome research. The method also facilitates the inclusion of thin metal film structures between two mating substances. Additional applications include fabrication of optical components that include materials of dissimilar thermal coefficients of expansion.

EXAMPLE

A standard 50 mm×25 mm glass microscope slide and 22 mm circular coverslip were used for bonding experiments. A simple cross microchannel was generated on the slide using the standard laboratory fabrication procedures. A sodium silicate solution was prepared from a concentrated commercial sodium silicate solution (J. T. Baker, $SiO_2$: 28.7%; $Na_2O$: 8.9%).

Diluted solutions with concentrations of 2.0, 5.0, 7.0, and 15 wt. % silicate in water were prepared and used. The substrate with the separation column and the coverslip were treated as follows:

(1) dip in $HF/NH_4$ solution for 1 minute with ultrapure water;
(2) hydrolyze in $NH_4OH/H_2O_2$ solution for at least 20 minutes, rinse with water and blow dry with argon gas;
(3) spin-on the diluted solution of sodium silicate in water on the coverslip at 4,000 rpm for 10 seconds;
(4) immediately bring the coverslip in contact with the glass substrate with the sodium silicate layer in between; and
(5) anneal the sample at 90° C. for 1 hour or room temperature overnight.

The pH values of the sodium silicate solutions were measured by a pH meter (Orion, model 290A). The eletro-osmostic flow of the low temperature fabricated microchip was studied using video imaging system and single point detection setups with Rodamine B (20 $\mu$M in 10 mM sodium tetraborate buffer) as a monitor at a laser wavelength of 514 nm.

Freshly diluted sodium silicate solutions were made from newly purchased concentrated solutions and gave strong bonding of the two glass surfaces both at 90° C. for an hour and at room temperature overnight. A bonding wave was observed once the two glass surfaces were brought into initial contact, similar to the silicon direct bonding process of Quenzer and Benecke. Within a few seconds the contacting wave spread over the entire area. The coverslip can be removed by a razor blade after the initial bonding, but it is very difficult to remove the coverslip after the annealing processes.

It is essential to have the two glass surfaces "dry" bonded, i.e., elimination of all excess water. Any water between the two surfaces will need higher temperature and longer time to remove, which results in the failure of the low temperature bonding process. Because of the small size and thinness of the coverslip, the sodium silicate solution usually gets under the coverslip when spun-on its surface, due to the insufficient initial acceleration of the spinner. This excess amount of solution on the edge of the back side of the coverslip will flow in between the two bonding surfaces easily during bonding, which may cause the contamination of the separation channel. Therefore, high spin speed (about 4,000 rpm) was used to ensure that both surfaces of the coverslip are dry.

It is desirable to use thicker films to bond to chip surfaces containing structural features, taking advantage of the gap filling ability of the sodium silicate layer. However, the high spin speed used will give very thin films. This can be solved by using higher solution concentrations. However, when the concentration is too high, the resulting high viscosity of the solution will generate spin-induced radial striations. Also, high pH at high concentration may not give sufficient amount of $Si(OH)_4$ group to have good bonding. Although the bond strength was not measured, the device made from 15 wt. % solution worked well. The 30 wt. % solution was tried and failed due to the formation of surface radial striations.

It was found that the shorter the time between finishing the surface preparation and pair formation, the easier and more successful the bonding. This may be attributable to the fact that dilution of concentrated sodium silicate solution reduces the pH and leads to a supersaturated solution of silicic acid $Si(OH)_4$ which has high reactivity.

The reactivity of the monomer solution decreases with time due to the polymerization and colloidal particles formation. The sodium silicate film spun-on the coverslip surface will also react with the atmospheric carbon dioxide and be set by $CO_2$. See, for example, "Silicate bonding of Inorganic Materials, Part I Chemical Reactions In Sodium Silicate at Room Temperature" by K. Mackenzie et al., *Journal of Materials Science*, 26 (1991) 769. Thus, the probability of bonding failure increases with the stand-by time.

For the same reason, the bonding solution has to be freshly prepared, and after the solution has been diluted for a long time, the bonding becomes very difficult. With old solutions, the two pieces have to be pressed together very hard to get the initial contact wave and there are many voids formed. Also, the coverslip can be removed by a razor blade more easily. The aging of the concentrated commercial sodium silicate solution was also observed. Four months after the initial use of the solution, the bonding became very difficult and much weaker, even though the bonding solution was freshly prepared from the concentrated solution.

When used as a binder, sodium silicate is known to be set and give great bonding strength by exposing to $CO_2$ gas, which is considered to follow two possible processes: (a) physical dehydration of the sodium silicate solution by the drying action of the $CO_2$ gas; and (b) neutralization of the silicate and gel formation by chemical reaction with the $CO_2$. Thus, the aging of the concentrated commercial solution may be attributed to the absorption of atmospheric $CO_2$ gas. It is known that colloidal particles are present together with $HSiO_3^-$ ions in solutions of sodium silicate having $SiO_2:Na_2O$ ratios greater than 2:1. The absorption of $CO_2$ may neutralize part of the alkali and release the silica from the $HSiO_3^-$ ions. This causes the growth of the colloidal particles and decrease of the reactivity of the diluted solution. Since $CO_2$ is a weak acidic gas, the pH of the bulk solution may not change much when the solution is aged (pH measured for newly purchased solution=12.5 and for 4 month old solution=12.4). A bottle of sodium silicate solution (EM Science) was observed to have the silica completely precipitated (pH measured 12.6), which can be explained by the fact that when the colloidal particles are large enough, sedimentation by gravity causes 0 precipitation. The main bonding mechanism is believed to be siloxane bond formation between the sodium silicate layer and the glass surfaces. When the concentrated solution is diluted and pH is reduced, the concentration of hydroxyl ions is no longer sufficient to keep the silicate ions from being hydrolyzed to $Si(OH)_4$. Thus, a supersaturated solution of silicic acid is formed with high reactivity, which leads to the condensation-polymerization with any OH—bearing surfaces, forming siloxane bonds until the supersaturation is relieved. The pH values for the bonding solutions were measured as follows:

| Original concentrated: | pH = 12.5 |
| --- | --- |
| 15 wt. %: | pH = 11.9 |
| 7 wt. %: | pH = 11.6 |
| 2 wt. %: | pH = 11.2 |

Initially, the two hydrophilic surfaces are attracted to each other and then connected by hydrogen bonding. After that, the siloxane bond formation occurs in the annealing process. the cationic bridging may also play a role in the bonding process.

FIG. 5 shows the eletro-osmostic flow of the chip made by sodium silicate bonding (7 wt. % and at 90° C. for 1 hour). The column was flushed with water for 20 minutes and then 10 mM sodium tetraborate buffer (pH 9.2) for another 20 minutes before each monitoring of the eletro-osmostic flow. After the first eletro-osmostic flow measurement, the chip was treated with 1 N NaOH for 20 minutes, and the eletro-osmostic flow was measured again. Another measurement was made after the chip was treated with 1 N NaOH for an additional hour. For comparison, a chip made from the high temperature direct bonding method was tested in the same way, and the results are shown in FIG. 6.

It can be seen from FIGS. 5 and 6 that there is no significant difference in the device performance between the chip made from sodium silicate bonding and that made from the high temperature direct bonding. As mentioned before, when the solution is aged, the bonding becomes weaker, but it still provides a satisfactory channel sealing. Although the strength of the bonding has not been measured, the device can be operated under pinched injection and separation at the voltage application of 1 kV for at least 50 cycles without any channel leakage observed.

Since the sodium silicate layer is only on the top side of the separation channel, it is assumed that the thin layer has turned to silica after the annealing process and the residual sodium silicate with lower $SiO_2:Na_2O$ ratios can be washed away by water so that it will not affect the eletro-osmostic flow.

Figure 7:
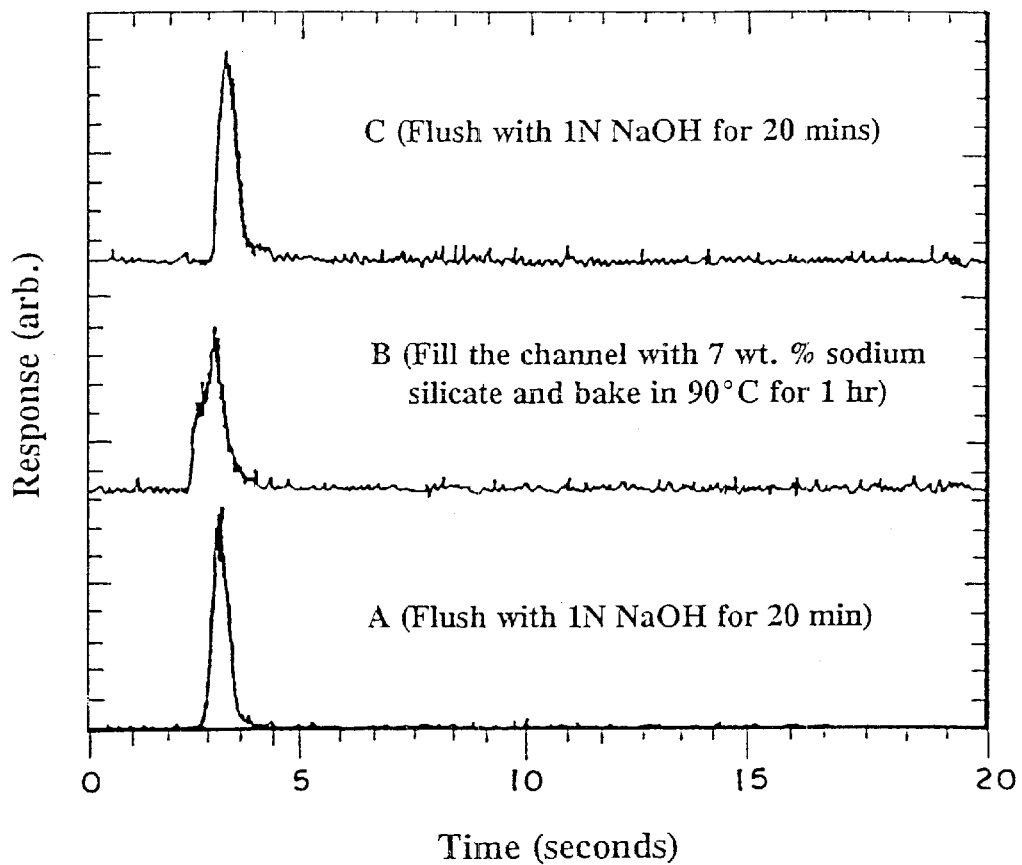
FIG. 7 is a graph illustrating the effect of sodium silicate solution in the channel on the electro-osmotic flow.

To check this point, a chip made from sodium silicate bonding was first flushed with 1 N NaOH for 20 minutes and then tested. Afterwards, it was filled with 7 wt. % diluted solution in the channel and dried in 90° C. for an hour before testing. Finally, the chip was again treated with 1 N NaOH for 20 minutes and tested. The results are shown in FIG. 7, which shows that the sodium silicate solution does not affect the eletro-osmostic flow significantly. However, the sample plug becomes non-uniform with a tail and this may be caused by the residual sodium silicate in the channel which changes the charge distribution of the channel surface. Also, when the channel was flushed with NaOH for longer periods of time, the eletro-osmostic flow eventually became slower, differing from the chip made from the direct bonding, as shown both in FIGS. 5 and 7. The NaOH may turn the residual sodium silicate in the channel with lower $SiO_2:Na_2O$ ratio to that with higher ratio, and thus consume the OH group on the surface.

In view of the above, the sodium silicate bonding methodology of the present invention has proven to be a simple, flexible and effective method for low temperature fabrication of microchip devices for capillary electrophoresis. Strong bonds have been achieved at room temperature and 90° C. with good channel sealing. There is no significant difference in the device performance between the chip made from sodium silicate bonding and that from the high temperature direct bonding. Although when the bonding solution is aged, the bonding becomes weaker, the channel sealing is still satisfactory and the device can be operated under normal conditions for at least 50 cycles without any leakage observed.

Although the results noted above relate to microchip fabrication, the principals of the invention apply to numerous other analogous uses. For example, the bonding technique can be used to bond glass optical components. The solution can be used as a bonding filler to allow inclusion of structures between glass components (e.g., thin-film metal electrodes). The methodology can also be used when bonding materials, such as optical components, that have dissimilar thermal coefficients of expansion. In addition, the method can also be used to bond other metal oxide forming materials together.

Figure 8:
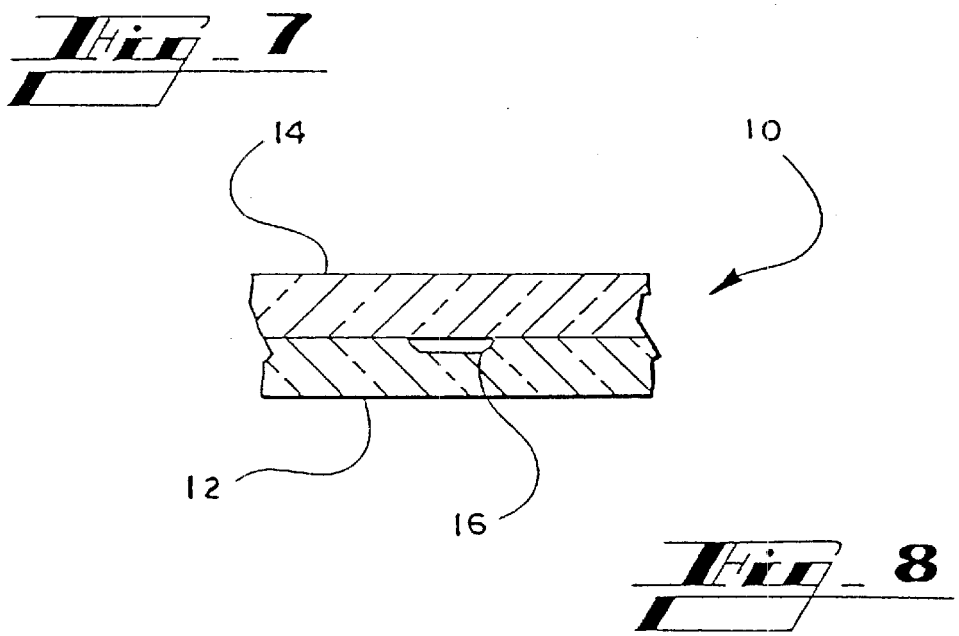
FIG. 8 is an example of a microchip formed according to the methodology of the present invention.

In FIG. 8, a sample composite structure 10 is shown. The structure 10 includes a base plate 12 and a cover plate 14. The base plate may be patterned using photolithographic techniques to form channels 16 in which microfluidic manipulations may be made. Both the base plate 12 and the cover plate 14 are made of glass and can be made from standard microscope slides.

The sodium silicate aqueous solution is applied to one of the mating surfaces of the two plates by a known spin-on technique.

The plates 12 and 14 could be any suitable mating components to construct other devices, such as optical devices, and may include metallic connections therebetween or thereon.

With respect to the bonding methodology, an alternative method involves heating the substrate so that it is at approximately 50° C. at the time of contacting with the sodium silicate coated coverplate.

The present invention is effective in bonding together two similar or two dissimilar materials using a monomolecular or quasi-monomolecular film that has the ability to covalently bond to one of the materials with a reactive moiety at one position on the molecule and covalently bond with the other material with a reactive moiety at another position on the molecule.

The invention is particularly suitable for bonding glass materials, and particularly silica-based materials. The bonding agent is preferably sodium silicate, but other chemically similar materials can be employed. For example, the film could be comprised of an alkoxy silane in an alchohol. Thus, while an aqueous solution is preferred for sodium silicate, other solutions can be employed for other bonding agents. Also, the bonding agent could include silicic acid and polymeric forms of silicic acid.

With respect to sodium silicate, the solution has a preferred range of 0.5 wt. % to less than 30 wt. %.

The materials bonded together can be similar (glass/glass) or dissimilar (meaning either different materials or chemically the same materials having different properties). It is, for example, possible to bond plastic to glass, materials having different coefficients of thermal expansion, etc.

The bonding techniques described herein are also useful in forming a variety of different types of devices, including the following:

Fabrication of In-Column Electrode

A metal electrode can be fabricated in a microchip column using two masks as shown in FIG. 9. The simple cross-column was generated with mask pattern 1 on a glass slide using standard fabrication procedures. After fabrication of the separation channel, the metal electrode is aligned and put into the injection cross with mask pattern 2 using the two alignment marks shown in the upper-left and lower-right regions of each slide.

The process for fabricating an electrode is shown sequentially in FIG. 10, and can be summarized as follows:

(I) sonicate the substrate with the separation channel in acetone for 5 minutes;

(ii) spin on photoresist at 500 rpm for 20 seconds and pattern the photoresist using mask 2 (soft bake, exposure, develop and hard bake);

(iii) dip the substrate in $HF/NH_4F/H_2O$ etch solution for 30 seconds with an etch rate of about 0.32 $\mu$m/min.

(iv) deposit Cr/Au 300/1,800 Å at 50° C.;

(v) lift-off in acetone.

In this way the electrode was embedded in the channel floor with a step of about 500 Å over the channel surface. the measured resistance of the electrode is around 50 Ω.

Figure 10:
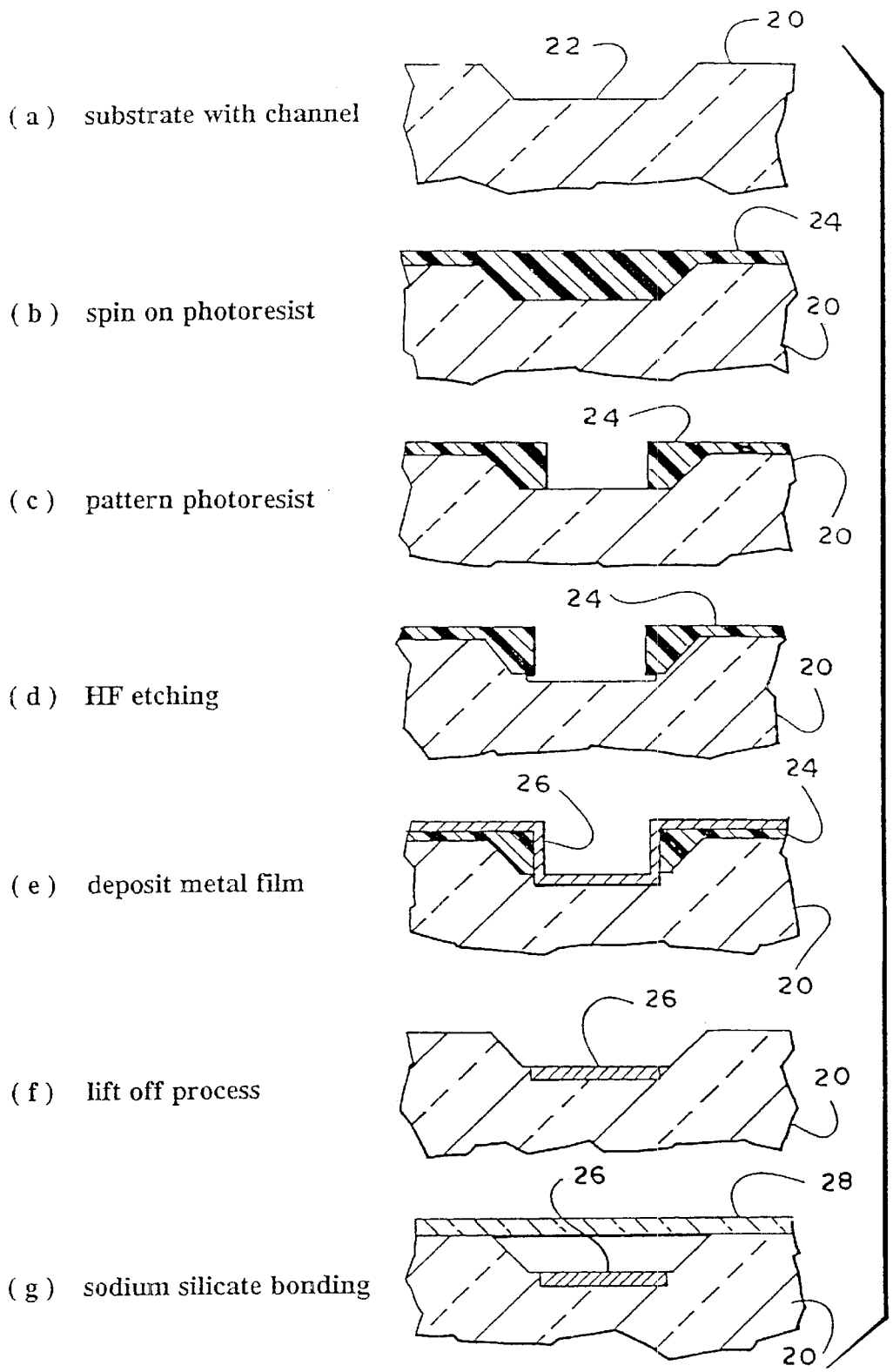
FIG. 10 illustrates the sequence of steps in forming the electrode.

The aforementioned sequence of steps is shown in FIG. 10, where at first the substrate 20 is provided with a channel 22. In FIG. 10(*b*), a photoresist layer 24 is applied. In FIG. 10(*e*) a metallic layer 26 is formed. This layer 26, after lift-off, becomes the electrode formed in the channel. A cover plate 28 is bonded to the substrate using the methods described above, including sodium silicate, to complete the microchip structure.

FIG. 11 shows the fabricated in-column electrode 26 which extends into the cross area of a microchannel 30. The width of the electrode is about 60 $\mu$m, and since the electrode 26 is inserted at an angle of 55° into the injection cross, the total length of the electrode along the channel is around 165 $\mu$m.

The electrode can be used in a microchip apparatus, as shown in FIG. 12, to measure the voltage at the cross. Other uses of the electrode fabrication technique include integrated circuit fabrication, as well as other related and analogous uses.

While the preferred embodiment of the present invention has been shown and described, it will be understood that it is intended to cover all modifications and alternate methods falling within the spirit and scope of the invention as defined in the appended claims or their equivalents.

What is claimed is:

1. A device comprising:
    a first non-perforated glass piece;
    a second non-perforated glass piece having a surface mating with a corresponding surface of the first non-perforated glass piece;
    a film disposed between the first and the second non-perforated glass pieces and bonding the first and second non-perforated glass pieces, the film being made of a bonding agent that is capable of covalently bonding to both mating surfaces, wherein the bonding between the first and second non-perforated glass pieces is effected without use of temperatures greater than 90° C., wherein the bonding agent is sodium silicate, silicic acid, polymeric forms of silicic acid, alkoxysilane, silane, or tetramethoxysilane; and
    at least one microchannel located on the mating surfaces of the glass pieces, wherein the at least one microchannel is a groove in the mating surface of the first or the second non-perforated glass piece.

2. A device according to claim 1, wherein the bonding is effected at room temperature.

3. A device according to claim 1, wherein the device further comprises bio-molecules or binding moieties located within the microchannel.

4. A device according to claim 3, wherein the biomolecules or binding moieties comprise nucleic acids, nucleic acid probes, enzymes, antibodies, peptides, or proteins.

5. A device according to claim 1, wherein the film is prepared by application of the bonding agent, wherein the bonding agent comprises an aqueous silicate solution at a concentration of less than about 30 wt. %.

6. A device according to claim 5, wherein the concentration is about 15 wt. % or less.

7. A device according claim 5, wherein the application of the bonding agent is carried out by spin coating.

8. A device according to claim 7, wherein the spin coating is effected at a spin speed of at least about 4,000 rpm.

9. A device according to claim 1, wherein the device further comprises a metal electrode.

10. A device according to claim 9, wherein the metal electrode is disposed in the microchannel.

11. A device according to claim 1, wherein the film is prepared by the applying the bonding agent by spin coating.

12. A device comprising two bonded, mating non-perforated glass pieces having respective mating surfaces and at least one microchannel located on the mating surfaces of the glass pieces, the mating surfaces being bonded by a bonding agent comprising a thin layer of silicate, wherein the bonding occurs without use of temperatures greater than 90° C. and the at least one microchannel is a groove in the mating surface of at least one of the glass pieces.

13. A device according to claim 12, wherein the device further comprises bio-molecules or binding moieties, wherein the bio-molecules or binding moieties are located within the at least one microchannel.

14. A device according to claim 13, wherein the biomolecules or binding moieties comprise nucleic acids, nucleic acid probes, enzymes, antibodies, peptides, or proteins.

15. A device according to claim 12, wherein the silicate layer is formed from an aqueous silicate solution with a concentration of less than 30 wt. %.

16. A device according to claim 15, wherein the concentration is about 15 wt. % or less.

17. A device prepared by a process comprising:
    providing first and second non-perforated mating pieces having respective mating surfaces and at least one microchannel located on the mating surfaces of the first or the second mating pieces, wherein the at least one microchannel is a groove in the mating surface of at least one of the mating pieces;
    applying an aqueous solution of silicate to a surface of the first non-perforated mating piece, wherein the concentration of silicate in the aqueous solution is less than 30 wt. %;
    eliminating excess water from the applied aqueous solution to form a film on the first non-porous mating piece, the film comprising a molecule having the ability to covalently bond to the first non-perforated mating piece with a reactive moiety at one position on the molecule and covalently bond with the second non-perforated mating piece with a reactive moiety at another position on the molecule;
    bringing the second non-perforated mating piece in contact with the first non-perforated mating piece with the film located between the first non-perforated mating piece and the second non-perforated mating piece, wherein the bonding method provides for strong bonds at temperatures of 90° C. and less.

18. A device according to claim 17, wherein each of the non-perforated mating pieces is a glass piece.

19. A device according to claim 17, wherein the step of eliminating water is carried out by spinning the first mating piece.

20. A device according to claim 19, wherein the spinning is carried out at a speed of at least about 4,000 rpm.

21. A device according to claim 17, wherein the concentration of silicate in the aqueous solution is about 15 wt. % or less.

22. A device according to claim 17, wherein the mating surface of the second non-perforated mating piece contains the at least one microchannel and the mating surface of the second non-perforated mating piece faces the thin layer.

23. A device according to claim 22, wherein the at least one microcharnel contains bio-molecules or binding moieties.

24. A device according to claim 23, wherein the biomolecules or binding moieties comprise nucleic acids, nucleic acid probes, enzymes, antibodies, peptides, or proteins.

25. A device according to claim 22, wherein the device further comprises a metal electrode, wherein the metal electrode is disposed in the at least one microchannel.

26. A device according to claim 17, wherein the film is substantially continuous.

27. A device according to claim 17, wherein the film is discontinuous.

* * * * *